(12) United States Patent
Gomez

(10) Patent No.: US 9,221,434 B2
(45) Date of Patent: Dec. 29, 2015

(54) METHOD FOR OPERATING A SELF-PROPELLED AGRICULTURAL MACHINE

(71) Applicant: CLAAS TRACTOR S.A.S., Velizy-Villacoublay Cedex (FR)

(72) Inventor: Christophe Gomez, Boulogne Billancourt (FR)

(73) Assignee: CLAAS TRACTOR S.A.S., Velizy-Villacoublay (FR)

( * ) Notice: Subject to any disclaimer, the term of this patent is extended or adjusted under 35 U.S.C. 154(b) by 0 days.

(21) Appl. No.: 14/035,297

(22) Filed: Sep. 24, 2013

(65) Prior Publication Data
US 2014/0095043 A1    Apr. 3, 2014

(30) Foreign Application Priority Data
Sep. 28, 2012 (EP) .................................. 12006806

(51) Int. Cl.
| B60T 7/06 | (2006.01) |
| B60Q 1/50 | (2006.01) |
| B60T 7/04 | (2006.01) |
| B60T 17/22 | (2006.01) |
| B60T 7/12 | (2006.01) |
| B60T 7/20 | (2006.01) |

(52) U.S. Cl.
CPC . *B60T 7/065* (2013.01); *B60Q 1/50* (2013.01); *B60T 7/042* (2013.01); *B60T 7/12* (2013.01); *B60T 7/20* (2013.01); *B60T 17/22* (2013.01); *B60T 2201/12* (2013.01)

(58) Field of Classification Search
CPC ............ B60Q 1/50; B60T 7/065; B60T 7/20; B60T 7/12; B60T 7/042; B60T 17/22; B60T 2201/12
See application file for complete search history.

(56) References Cited

U.S. PATENT DOCUMENTS

| 5,023,599 | A | * | 6/1991 | Mitchell et al. ............... 340/467 |
| 5,505,267 | A | * | 4/1996 | Orbach et al. ..................... 172/3 |
| 6,029,764 | A | * | 2/2000 | Schubert .................... 180/89.13 |
| 7,015,805 | B2 | * | 3/2006 | Knoop et al. ................. 340/467 |
| 2005/0096825 | A1 | * | 5/2005 | Lee ................................ 701/70 |
| 2008/0262679 | A1 | * | 10/2008 | Baumann et al. ............... 701/45 |

FOREIGN PATENT DOCUMENTS

DE         203 15 755         1/2004

* cited by examiner

*Primary Examiner* — John Q Nguyen
*Assistant Examiner* — Michael Kerrigan
(74) *Attorney, Agent, or Firm* — Michael J. Striker

(57) ABSTRACT

A method for operating a self-propelled agricultural machine that has a traction drive, a service brake, a control and a man machine interface including an accelerator pedal and a brake pedal, where a user actuation of the brake pedal causes the service brake to be operated. The method includes monitoring the user actuation of the accelerator pedal by the control to detect a brake indication, which is a predetermined indication for an approaching user actuation of the brake pedal. Upon detecting a brake indication, the control implements at least one preparatory measure by the control for the preparation of a user actuation of the brake pedal. The implemented preparatory measure alone does not have a braking effect on the agricultural machine.

15 Claims, 1 Drawing Sheet

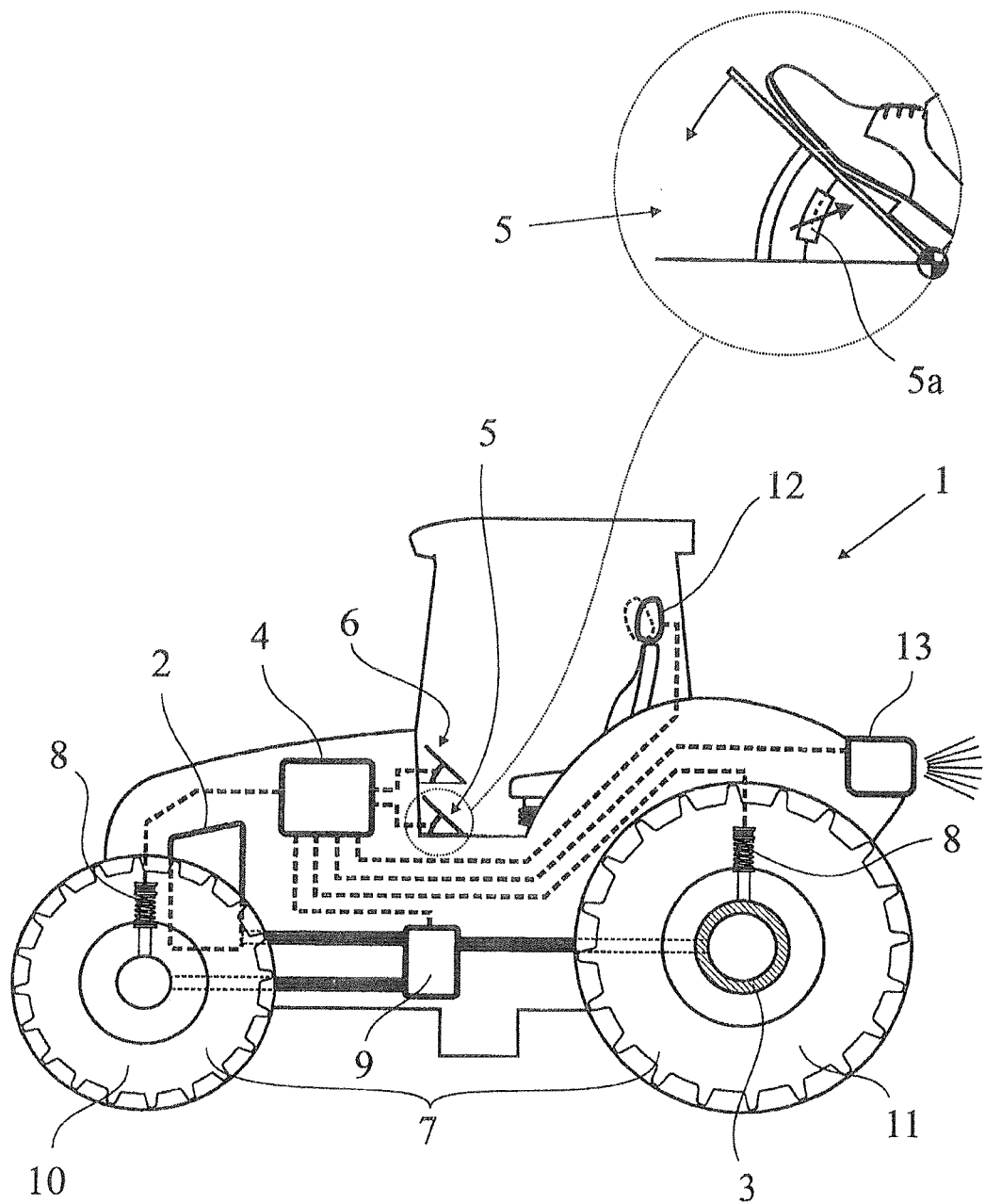

METHOD FOR OPERATING A SELF-PROPELLED AGRICULTURAL MACHINE

CROSS-REFERENCE TO A RELATED APPLICATION

The invention described and claimed hereinbelow is also described in European Priority Document EP 12006806.9, filed on Sep. 28, 2012. The European Priority Document, the subject matter of which is incorporated herein by reference, provides the basis for a claim of priority of invention under 35 U.S.C. 119(a)-(d).

BACKGROUND OF THE INVENTION

The invention relates to a method for operating a self-propelled agricultural machine, a self-propelled agricultural machine and a control for a self-propelled agricultural machine.

German patent document no. DE 203 15 755 U1 discloses an agricultural machine that comprises a traction drive for generating a driving movement, a service brake for braking of the driving movement and a man machine interface. The man machine interface includes an accelerator pedal for influencing the speed and/or the torque of the driving movement provided by the traction drive and a brake pedal for operating the service brake.

A trailer with a trailer brake system is attached to the known agricultural machine, where the trailer brake system is operated automatically when the accelerator pedal is retracted by the user. Although this method of automatically triggering braking operations based on the user actuation of the accelerator pedal may lead to an improved braking effect, it has a surprising effect on the user as he may or may not have expected this automatism. In some cases, this may lead to a panic reaction of the user and in the end to a dangerous situation.

SUMMARY OF THE INVENTION

The present invention overcomes the shortcomings of known arts, such as those mentioned above.

To that end, the present invention provides a user-optimized braking strategy. The invention is based on the general idea that certain user actuations indicate a high probability for the user actuating the brake pedal in the very near future. Such an indication for an approaching user actuation of the brake pedal, which is called "brake indication" in the following description, can be the quick release of the accelerator pedal.

That is, the invention is configured to detect whether a predetermined brake indication for an approaching user actuation of the brake pedal is present and, if yes, to prepare the agricultural machine for the expected user actuation of the brake pedal. To do so, at least one preparatory measure is taken by the control. The preparatory measure taken alone does not have a braking effect on the agricultural machine, but makes sure that the user is not surprised by a braking effect without him/her actuating the brake pedal.

The above-noted preparatory measure is triggered by the detection of a brake indication. That is, the user actuation (preferably the user actuation of the accelerator pedal), is monitored by the control in view of the detection of the brake indication. The control preferably comprises a memory for at least one brake indication and, most preferably, a number of brake indications.

According to the invention, certain user activities that are normally followed by a user actuation of the brake pedal lead to triggering at least one preparatory measure for the preparation of such user actuation of the brake pedal, but without actually performing a braking operation. With an appropriate design, it is possible with the preparatory measure to improve the braking effect, the braking safety or the like without the user being surprised by an unannounced braking operation.

An easy to detect a brake indication is a very quick release of the accelerator pedal, which only requires providing the brake pedal with a simple sensor. The brake indication of a quick release of the accelerator pedal is reliable in view of a user actuation of the brake pedal actually following the brake indication. However, it may happen that the user slips from the accelerator pedal by mistake and same may be detected as an above-noted brake indication. Here, it is of particular advantage that the preparatory measure taken alone (as noted above), does not have a braking effect on the agricultural machine. Therefore, no unwanted brake operation will take place.

Depending on the preparatory measure triggered after detecting an above noted brake indication, it may be necessary to stop or withdraw the preparatory measure at a certain point. For this, at least one reset condition is defined. The detection by the control leads to the preparatory measure being stopped or being withdrawn. This ensures that the agricultural machine is always reset to an initial state at some point.

Preferably, the preparatory measure is directed to supporting the expected operation of the service brake, which measure includes all actions that make the braking process itself more effective. Most preferably, this measure is directed on a corresponding configuration of the drive train or the suspension of the agricultural machine.

In the case when only the back wheels of tractor or the like are breakable, the preparatory measure may be to close a four wheel drive clutch such that the braking effect on the back wheels is transferred to braking the front wheels. The closing of the four wheel drive clutch taken alone does not have a braking effect on the agricultural machine.

The preparatory measure also may be directed to configuring the agricultural machine by the control to improve the passenger crash safety, for example, by configuring the passive safety system of the agricultural machine. For that matter, this configuring can include the movement of a headrest or the like into its safety position.

BRIEF DESCRIPTION OF THE DRAWINGS

Further features and advantages of the invention will become apparent from the description of embodiments that follows, with reference to the attached figures, wherein:

FIG. 1 is a schematic side view of an agricultural machine according to the invention.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 shows a self-propelled agricultural machine 1 as comprising a traction drive 2 for providing driving movement of the agricultural machine 1 and 8 service brake 3 for braking the driving movement of the agricultural machine 1.

The agricultural machine 1 is further comprises a control 4 that is a centralized structure as shown as well as of decentralized structure. The control 4 is preferably an electronic control that triggers various electric or electronic components of the agricultural machine 1.

The agricultural machine 1 further comprises a man machine interface including at least an accelerator pedal 5 and a brake pedal 6. Other components of the man machine interface are not shown in the FIGURE, namely components as a steering wheel, a display or the like.

A user actuation of the accelerator pedal 5 allows the user control of the driving speed and/or driving torque. Actuation of the accelerator pedal 5 influences the engine speed of the traction drive 2 or influences a control of a transmission, in particular, the gear transmission ratio of a transmission, for example, of a continuously variable transmission (CVT-transmission).

A user actuation of the brake pedal 6 causes the service brake 3 to be operated. Up to this point, the agricultural machine 1 comprises a standard structure. The user actuation, here and, preferably the user actuation of the accelerator pedal 5, are monitored by the control 4 in view of detecting a predetermined indication 6 for an approaching user actuation of the brake pedal 6. To do so, the accelerator pedal 5 is provided with a sensor 5a. Sensor 5a may be an analogue sensor which gives an indication which distance the accelerator pedal 5 has travelled. Generally, however, any kind of sensor may be applied here that gives a signal related to the movement of the accelerator pedal 5, without deviating from the scope and spirit of the invention. Here, for example, a brake indication can be a quick release of the accelerator pedal 5, as will be explained in further detail hereinbelow.

With the brake indication detected by the control 4, at least one preparatory measure is being taken by the control 4 for the preparation of a user actuation of the brake pedal 6.

A further interesting aspect of the invention is that proposed solution is that the above-noted preparatory measure taken alone does not have a braking effect on the agricultural machine 1. Accordingly, there are no surprising brake operations if no user actuation of the brake pedal 6 follows the detection of a brake indication.

Generally it is possible that one and the same preparatory measure is taken when the control 4 has detected a brake indication. However, it is preferred that different preparatory measures and different brake indications are defined. For example, it is advantageous if different preparatory measures are taken by the control 4 depending on the brake indication detected.

In this regard, a first indication that corresponds to an approaching emergency brake operation leads to a first preparatory measure while a second indication corresponding to a normal brake operation leads to a second preparatory measure. The first preparatory measure preferably includes configuring the passive safety system in view of an expected crash situation. The second preparatory measure is directed to a standard brake preparation, for example, stiffening the suspension or the like.

There are several ways to define the above noted, predetermined brake indication. One possibility is that the brake indication corresponds to a release of the accelerator pedal 5 with a predetermined accelerator pedal movement. This preferably is an accelerator pedal movement exceeding a predetermined rate of movement. In other words, a quick release of the accelerator pedal 5 may be detected as an above noted brake indication 6.

There are other brake indications for a possible approaching user actuation of the brake pedal 6. In particular, various parameters that correspond to the user actuation are taken into account. For example a camera system is provided to detect whether the gesture of the user reveals a stress situation that might indicate that the user is about to actuate the brake pedal 6.

Depending on the kind of preparatory measure, it may be necessary to stop the preparatory measure or even withdraw the preparatory measure at some point. For this, a predetermined reset condition is detected by the control 4. When such a reset condition has been detected by the control 4, the preparatory measure is being stopped or withdrawn (as noted above).

One possible (and easy to realize) reset condition is that no user actuation of the brake pedal 6 is detected within a predetermined time period after detecting the brake indication 6. An alternative is the evaluation that the expected actuation of the brake pedal 6 has taken place such that no further braking is necessary.

There are also a number of options possible for the definition of the preparatory measure. On definition, for example, is the preparatory measure directed to configuring the agricultural machine 1 by the control 4 to support the expected approaching operation of the service brake 3. This configuring of the agricultural machine 1 may comprise configuring the drive train 7, the suspension 8 or any other component that is suitable for supporting the expected approaching operation of the service brake 3.

Preferably, the agricultural machine 1 is designed as a four wheel drive machine with a four wheel drive clutch 9 between front wheels 10 and rear wheels 11. As such, the preparatory measure is closing the four wheel drive clutch 9 of the agricultural machine 1 by the control 4. This closing of the four wheel drive clutch 9 is positively influencing the brake effect, in particular when the service brake 3 is provided only for the rear wheels or the front wheels.

The tractor shown in the FIGURE has a service brake 3 provided only for the rear wheels 11 such that closing of the four wheel drive clutch 9 leads to the brake operation being transferred via the four wheel drive clutch 9 to the front wheels 10. In this case, it is particularly advantageous to close the four wheel drive clutch 9 before the brake operation is actually taking place. In doing so, the closing of the four wheel drive clutch 9 is triggered without the clutch 9 being stressed by braking forces.

As noted above, a preparatory measure may be implemented to the suspension 8 of the agricultural machine as well. In an embodiment, the stiffness of the suspension 8 is configured by the control 4, wherein the preparatory measure is stiffening the suspension 8 in view of an improved brake performance.

The preparatory measure also may be directed to configuring the agricultural machine 1 by the control 4 to improve the passenger crash safety in view of the expected approaching operation of the service brake 3. The preparatory measure is directed to configuring the passive safety system of the agricultural machine 1 to improve the noted passenger crash safety. For that matter, FIG. 1 shows a component 12 (preferably a headrest 12 or the like), which headrest 12 is movable into a safety position by the control 4 for improving the passenger's crash safety. In this case, the preparatory measure can be to move the headrest 12 into its safety position (as shown in a dotted line in FIG. 1).

In another embodiment, the agricultural machine 1 comprises a brake light system 13, wherein the preparatory measure is the operation of the brake light system 13 such that the brake light system 13 is operated when the brake indication has been detected. The operation of the brake light even before the user actuates the brake pedal 6 leads to an additional safety for the vehicles following the agricultural machine 1.

The proposed triggering of a preparatory measure, after detecting a brake indication, is supplemented by the following.

In the case where the agricultural machine 1 comprises a trailer (not displayed) with a trailer brake system, the control 4 operates the trailer brake system as a function of the monitoring of the accelerator pedal 5. In one preferred option, the release of the accelerator pedal 5 generally leads to the control 4 operating the trailer brake system actually braking the trailer.

Preferably, the control 4 detecting an above noted brake indication 6 leads to the control 4 operating the trailer brake system. Braking the trailer when the brake indication has been detected by the control 4 makes good sense here as, for example, the release of the accelerator pedal 5 in any case causes a certain motor brake effect.

In order to prevent the trailer from pushing the agricultural machine 1 from behind, the above noted operation of the trailer brake system makes sense. Here, the above noted teaching with preparatory measures, that taken alone do not have a braking effect on the agricultural machine 1, does not mean that no other functions are present that provide some kind of a braking effect without the user actuating the brake pedal 6.

Finally it may be pointed out that the term "service brake" is to be understood in a broad sense to include a friction brake system as well as a motor brake system or an inch brake system. Accordingly, the brake pedal 6 may be assigned to one or more of the above noted brake systems.

In an alternative embodiment, the invention is implemented in/as a self-propelled agricultural machine 1, where all of the above noted explanations are fully applicable on this agricultural machine 1.

In another embodiment, the invention is implemented as a control 4 for an above-noted self-propelled agricultural machine 1, where all of the above explanations are fully applicable on this control 4. As will be evident to persons skilled in the art, the foregoing detailed description and FIGURES are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for operating a self-propelled agricultural machine (1) comprising a traction drive (2), a service brake (3), a control (4) and a man machine interface including an accelerator pedal (5) and a brake pedal (6), wherein a user actuation of the brake pedal (6) causes the service brake (3) to be operated, the method comprising the steps of:
   monitoring the user actuation of the accelerator pedal (5) by the control (4) to detect a brake indication, which is a predetermined indication for an approaching user actuation of the brake pedal (6); and
   upon detecting a brake indication, implementing at least one preparatory measure by the control (4) for the preparation of a user actuation of the brake pedal (6);
   wherein the implemented preparatory measure alone does not have a braking effect on the agricultural machine (1); and
   wherein the preparatory measure is directed to configuring the drive train (7) or the suspension (8) of the agricultural machine (1) by the control (4) to support the expected approaching operation of the service brake (3).

2. The method according to claim 1, wherein the at least one preparatory measures are taken by the control (4) depending on the brake indication being detected.

3. The method according to claim 1, wherein the brake indication corresponds to a release of the accelerator pedal (5) with a predetermined accelerator pedal movement.

4. The method according to claim 3, wherein the predetermined accelerator pedal movement is an accelerator pedal movement exceeding a predetermined rate of movement.

5. The method according to claim 1, wherein if a predetermined reset condition is detected by the control (4), stopping or withdrawing the preparatory measure.

6. The method according to claim 5, wherein the reset condition is that no user actuation of the brake pedal (6) is detected within a predetermined time period after detecting a brake indication.

7. The method according to claim 1, wherein the agricultural machine (1) is a four wheel drive machine with a four wheel drive clutch (9) between front wheels (10) and rear wheels (11) and wherein that the preparatory measure is closing the four wheel drive clutch (9) of the agricultural machine (1).

8. The method according to claim 7, wherein the service brake (3) is provided only for the rear wheels (10) or the front wheels (11).

9. The method according to claim 1, wherein a stiffness of the suspension (8) of the agricultural machine (1) is configured by the control (4) and wherein the preparatory measure is stiffening the suspension (8) in view of an improved brake performance.

10. The method according to claim 1, wherein the preparatory measure includes configuring a passive safety system of the agricultural machine (1) by the control (4) to improve the passenger crash safety in view of the expected approaching operation of the service brake (3).

11. The method according to claim 10, wherein the passive safety system comprises a component (12) that is moveable into a safety position by the control (4) for improving the passenger crash safety and wherein the preparatory measure is to move the component (12) into its safety position.

12. The method according to claim 1, wherein the agricultural machine (1) comprises a brake light system (13) and wherein the preparatory measure is the operation of the brake light system (13).

13. The method according to claim 1, wherein the agricultural machine (1) comprises a trailer with a trailer brake system and wherein the control (4) operates the trailer brake system as a function of the monitoring of the accelerator pedal (5).

14. A self-propelled agricultural machine with a traction drive (2), a service brake (3), a control (4) and a man machine interface including an accelerator pedal (5) and a brake pedal (6), wherein a user actuation of the brake pedal (6) causes the service brake (3) to be operated, wherein the control (4):

monitors user actuation of the accelerator pedal (5) in order to detect a brake indication, which is a predetermined indication for an approaching user actuation of the brake pedal (6); and if a brake indication is detected, the control (4) taking at least one preparatory measure for the preparation of a user actuation of the brake pedal (6);

wherein the taken preparatory measure alone does not have a braking effect on the agricultural machine (1); and wherein the preparatory measure is directed to configuring the drive train (7) or the suspension (8) of the agricultural machine (1) by the control (4) to support the expected approaching operation of the service brake (3).

15. A control (4) for a self-propelled agricultural machine (1) comprising a traction drive (2), a service brake (3) and a man machine interface including an accelerator pedal (5) and a brake pedal (6), wherein a user actuation of the brake pedal (6) causes the service brake (3) to be operated, the control implementing the steps of:

monitoring, by the control (4), the user actuation of the accelerator pedal (5); and upon detecting a brake indication, which is a predetermined indication for an approaching user actuation of the brake pedal (6), taking, by the control (4), at least one preparatory measure for the preparation of a user actuation of the brake pedal (6);

wherein the preparatory measure taken alone does not have a braking effect on the agricultural machine (1); and wherein the preparatory measure is directed to configuring the drive train (7) or the suspension (8) of the agricultural machine (1) by the control (4) to support the expected approaching operation of the service brake (3).

\* \* \* \* \*